(12) United States Patent
Yoshida

(10) Patent No.: US 7,716,537 B2
(45) Date of Patent: May 11, 2010

(54) INFORMATION PROCESSING APPARATUS AND ERROR CORRECTION METHOD

(75) Inventor: Kenji Yoshida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/398,003

(22) Filed: Mar. 4, 2009

(65) Prior Publication Data

US 2009/0265579 A1    Oct. 22, 2009

(30) Foreign Application Priority Data

Apr. 16, 2008   (JP)   ............... 2008-107130

(51) Int. Cl.
*G06F 11/00*    (2006.01)
(52) U.S. Cl. ....................................... 714/52
(58) Field of Classification Search ............... 714/52
See application file for complete search history.

(56) References Cited

U.S. PATENT DOCUMENTS

| | | | |
|---|---|---|---|
| 4,538,265 A | 8/1985 | Day et al. | |
| 6,167,549 A * | 12/2000 | Lin et al. | 714/763 |
| 6,332,181 B1 | 12/2001 | Bossen et al. | |
| 6,543,028 B1 * | 4/2003 | Jamil et al. | 714/800 |
| 2009/0070654 A1 * | 3/2009 | Flachs et al. | 714/758 |
| 2009/0204766 A1 * | 8/2009 | Jacobi et al. | 711/133 |

FOREIGN PATENT DOCUMENTS

| | | |
|---|---|---|
| JP | S59-174952 A | 10/1984 |
| JP | 03-225433 | 10/1991 |
| JP | H04-277847 | 10/1992 |
| JP | 07-334374 | 12/1995 |
| JP | 2000-099406 | 4/2000 |

OTHER PUBLICATIONS

Explanation of Non-English Language References.

* cited by examiner

*Primary Examiner*—Bryce P Bonzo
(74) *Attorney, Agent, or Firm*—Knobbe, Martens, Olson & Bear LLP

(57) ABSTRACT

According to one embodiment, a memory interface module is configured to read one of instructions stored in a memory in accordance with a memory address designated by a fetch request issued from a processor. An error detection module is configured to detect an error in the read instruction. An instruction transmission module is configured to send to the processor, upon detection of an error in the read instruction, a first instruction to hold on a stack the same memory address as the one designated by the fetch request and a second instruction to jump to an error correction routine for correcting an error of the read instruction.

11 Claims, 4 Drawing Sheets

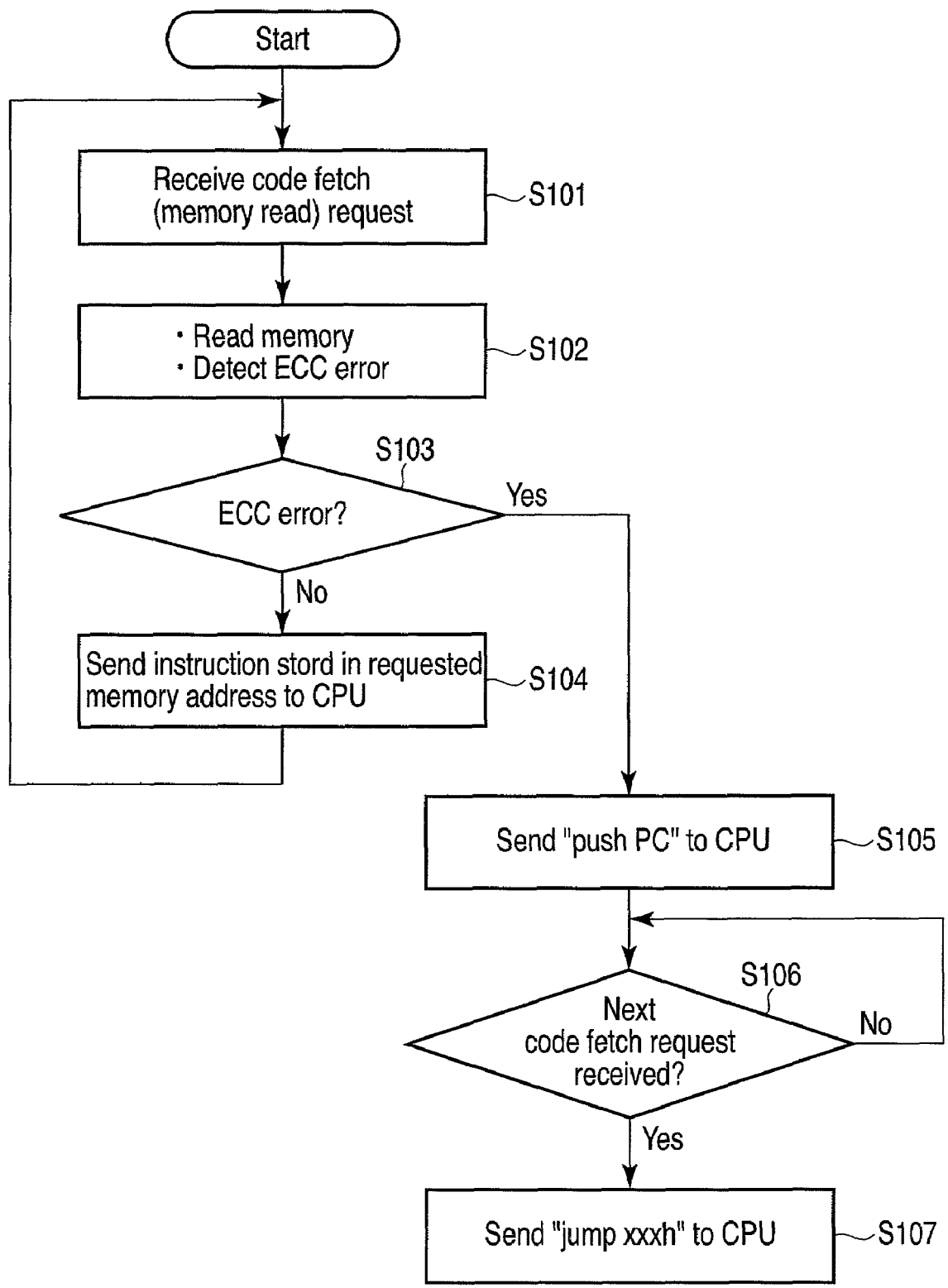
F I G. 3

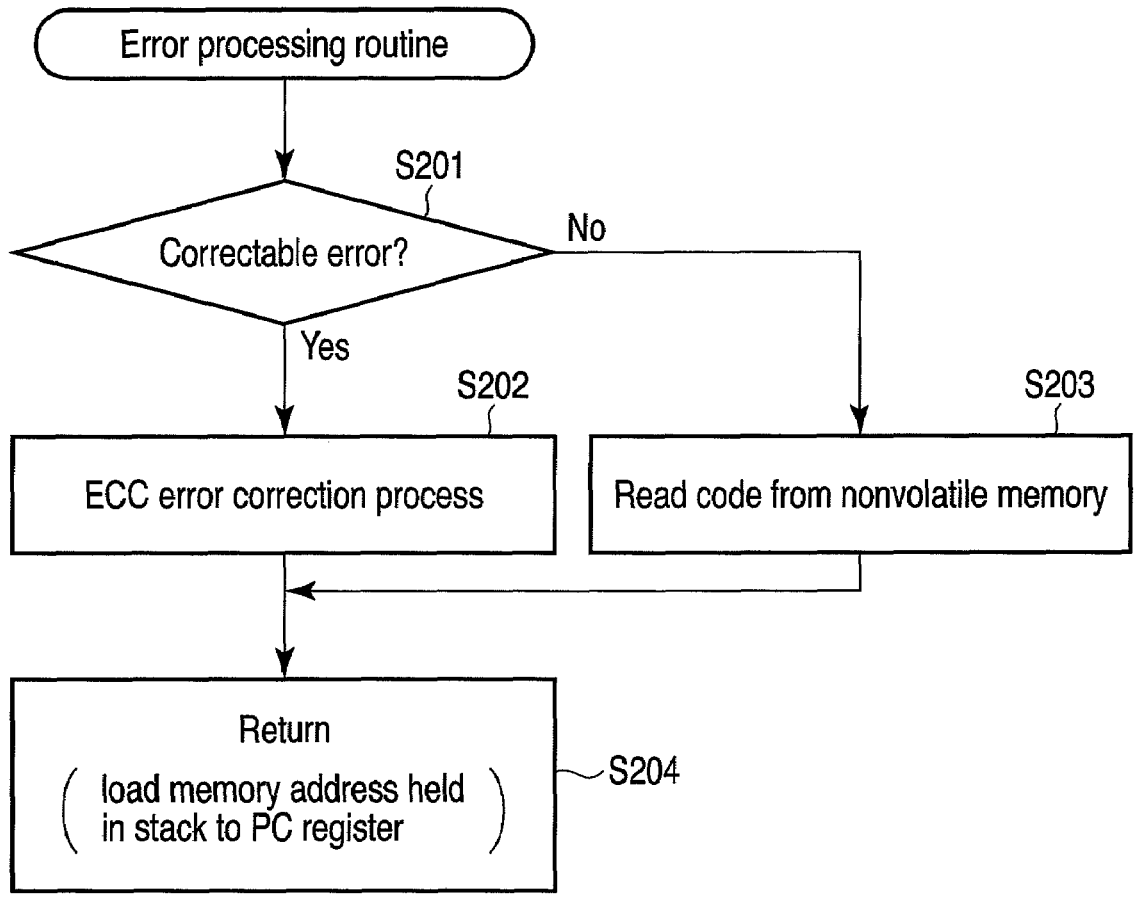
F I G. 4

INFORMATION PROCESSING APPARATUS AND ERROR CORRECTION METHOD

CROSS-REFERENCE TO RELATED APPLICATIONS

This application is based upon and claims the benefit of priority from Japanese Patent Application No. 2008-107130, filed Apr. 16, 2008, the entire contents of which are incorporated herein by reference.

BACKGROUND

1. Field

One embodiment of the invention relates to an information processing apparatus and an error correction method for correcting a memory error.

2. Description of the Related Art

In recent years, various information processing apparatuses such as the personal computer, the personal digital assistants (PDA) and the embedded system have been developed.

In these information processing apparatuses, the instructions executed by the processor are normally stored in a memory such as the dynamic RAM. In a case where an error such as an ECC error is detected in the instruction fetched from the memory, the delivery of the particular instruction to the processor has to be prohibited.

Jpn. Pat. Appln. KOKAI Publication No. 2000-99406 discloses a system for recovering an error using an interrupt. In this system, the occurrence of an error is reported using a special interrupt called "the data storage interrupt".

The technique disclosed in Jpn. Pat. Appln. KOKAI Publication No. 2000-99406, however, is applicable only to the processor of a specified type which supports the special interrupt called the data storage interrupt. A new function is required to be realized, therefore, in which a memory error can be corrected without using the special method like the interrupt.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary flowchart for explaining a operation of a control circuit provided in the information processing apparatus according to the embodiment; and FIG. 4 is an exemplary flowchart for explaining a procedure of an error correction process executed by the information processing apparatus according to the embodiment.

DETAILED DESCRIPTION

Various embodiments according to the invention will be described hereinafter with reference to the accompanying drawings. In general, according to one embodiment of the invention, an information processing apparatus comprises a memory interface module, an error detection module, and an instruction transmission module. The memory interface module is configured to read one of instructions stored in a memory in accordance with a memory address designated by a fetch request issued from a processor. The error detection module is configured to detect an error in the read instruction. The instruction transmission module is configured to send to the processor, upon detection of an error in the read instruction, a first instruction to hold on a stack the same memory address as the one designated by the fetch request and a second instruction to jump to an error correction routine for correcting an error of the read instruction. The memory address held on the stack is loaded to a program counter of the processor after completion of an error correction process by the error correction routine.

Figure 1:
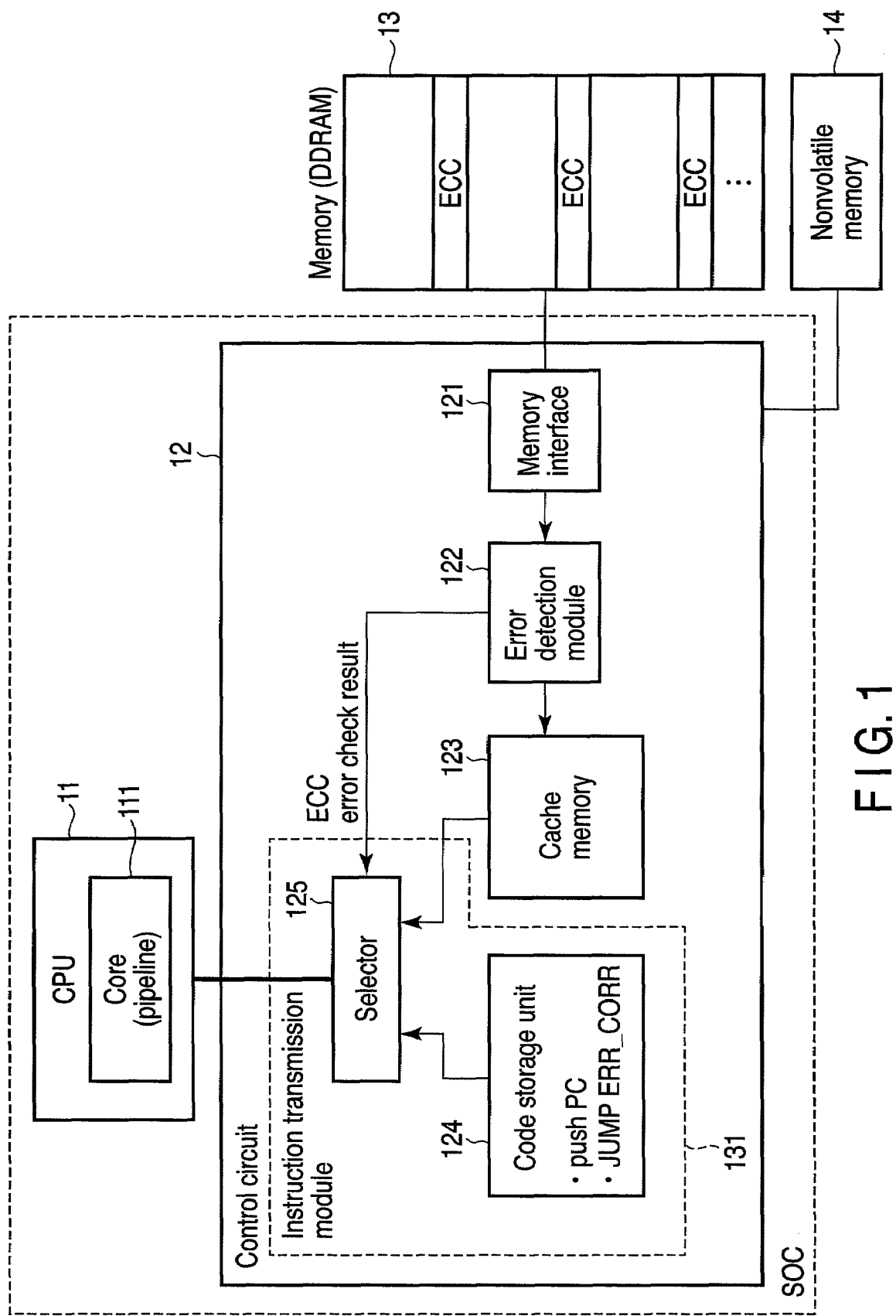
FIG. 1 is an exemplary block diagram showing a configuration of an information processing apparatus according to an embodiment of the invention.

First, a configuration of an information processing apparatus according to an embodiment of the invention will be described with reference to FIG. 1. This information processing apparatus is used as a computer such as a personal computer or as an embedded system built into an electronic device such as a hard disk drive. This information processing apparatus includes a CPU 11 and a control circuit 12.

The CPU 11 is a processor for executing various programs. The CPU 11 executes various arithmetic processes and controls each device in the information processing apparatus or each device in the electronic device. This CPU 11 has an interrupt signal input terminal for receiving an interrupt signal INT.

The CPU 11 also includes a core unit 111 having the pipeline structure of plural stages and can prefetch several instructions (also called code). The memory location (memory address) of the instruction to be fetched is designated by the program counter in the CPU 11. The program counter is sometimes called an instruction pointer. Normally, the value of the program counter is updated sequentially to fetch the next instruction from the next memory address. The CPU 11 issues a fetch request to fetch an instruction from the memory. This fetch request includes the memory address indicated by the program counter. Specifically, the CPU 11 issues, as a fetch request, a memory read request to read the information (the instruction in a case under consideration) on the memory address indicated by the program counter.

A processor including a local memory may be used as the CPU 11. The local memory in the CPU 11 is configured of, for example, a static RAM. This local memory can store a part of the instructions to be executed by the CPU 11. Specifically, the processing routines such as the error processing routine and the interrupt handler closely related to the system control are stored in the local memory.

The control circuit 12 is connected to the local bus 10 of the CPU 11. The control circuit 12 has the memory control function to access an external memory in accordance with a memory access request from the CPU 11. For example, the control circuit 12 and the CPU 11 can be implemented as a one-chip microcomputer such as a System-On-Chip (SOC). This one-chip microcomputer functions as a core unit of the information processing apparatus according to this embodiment.

The memory 13 is an external memory for storing the instructions executed by the CPU 11. The memory 13 can be connected to a memory interface included in the control circuit 12. A system obtained by adding the memory 13 serving as an external memory to the configuration of the information processing apparatus including the CPU 11 and the control circuit 12 functions as the information processing system according to the embodiment.

The memory 13 has stored therein, for example, instructions and error correction codes corresponding to the instructions. The well-known various error-correctable redundant codes such as ECC and CRC can be used as the error correction codes. An error correction code may be prepared for each instruction or each block data (plural instructions).

The memory 13 is configured of, for example, a dynamic RAM. The dynamic RAM is a memory having a speed lower than that of a static RAM configuring the local memory of the CPU 11, but can be manufactured at a lower cost per bit than that of the static RAM. According to this embodiment, both the local memory and the memory 13 are mapped to the memory address space of the CPU 11.

A nonvolatile memory 14 stores various programs (instructions). For example, in system start-up of the information processing apparatus, the instructions stored in the nonvolatile memory 14 are loaded distributively to the memory 13 and the local memory of the CPU 11. The error correction routine may be stored in either the memory 13 or the local memory of the CPU 11.

The control circuit 12 includes a memory interface module 121, an error detection module 122, a cache memory 123, a code storage unit 124 and a selector 125.

The memory interface module 121 reads one of the instructions stored in the memory 13 in accordance with the memory address designated by a fetch request (memory read request) issued from the CPU 11. Specifically, an instruction is read from the memory location of on the memory 13 designated by the memory address included in the fetch request.

The error detection module 122 is configured to detect an error in the instruction that has been read. Specifically, the error detection module 122 detects whether the instruction that has been read contains an error or not, using the error correction code (ECC) on the memory 13 corresponding to the instruction that has been read. The result of the error detection process (ECC check process) is sent to the selector 125. Also, the instruction that has been read is held in the cache memory 123.

The cache memory 123 is a cache provided for reducing the latency required for loading the instruction on the memory 13 which the CPU 11 has requested to fetch. This cache memory 123 stores a part of the instructions stored in the memory 13. The cache memory 123 is configured of, for example, a static RAM.

The code storage unit 124 and the selector 125 function as an instruction transmission module 131. Upon detection of a memory error (ECC error, etc.) at the time of reading an instruction from the memory 13, the instruction transmission module 131 executes the process of replacing the instruction to be sent to the CPU 11 from the instruction (the instruction detected to contain an ECC error) of the memory address designated by the fetch request to an instruction for jumping to the error correction routine.

More specifically, the instruction transmission module 131 sends out at least two instructions, in place of the instruction that has been read, to the CPU 11 in a case where an error is detected in the instruction read from the memory 13, i.e., existence of an error in the instruction requested to be fetched is detected by the error detection module 122.

One of the two instructions is a first instruction (push instruction) to hold, on the stack, the same memory address as the one designated by the fetch request. This first instruction instructs the CPU 11 to hold, on the stack, the same memory address as the one designated by the fetch request as information required to return the control to the instruction (the instruction requested to be fetched) in which an error is detected.

At the time of return from the subroutine call, the control is generally returned to the instruction next to the call instruction. Specifically, the instruction at the time of return from the subroutine is the instruction next to the call instruction. According to this embodiment, in order to return the control to the instruction (the instruction requested to be fetched) detected to be in error, the process is executed to hold, on the stack, the same memory address as that designated by the fetch request.

The other instruction is a second instruction (jump instruction) to jump to the error correction routine in which the error correction process for the instruction that has been read is executed by use of the error correction code. This second instruction permits the control to be transferred to the error correction routine. Upon complete error correction process by the error correction routine, the memory address held on the stack is loaded to the program counter. As a result, the control is returned to the instruction (the instruction requested to be fetched) in which an error has been detected.

The instructions sent from the instruction transmission module 131 to the CPU 11 will be specifically described below.

Upon detection of an error in the instruction that has been read, the instruction transmission module 131 sends to the CPU 11 the following instructions stored in the code storage unit 124:

"push PC"
"push error_flag"
"jump ERR_CORR"

where the instruction "push PC" is the first instruction described above. This instruction "push PC" is to instruct the CPU 11 to hold the value "PC" of the program counter (PC register) on the stack (memory area). Depending on the architecture of the CPU 11, the PC register may have been incremented to indicate the next address. In such a case, the value obtained by decrementing the value "PC" by one (or the value obtained by decrementing the value "PC" by the value corresponding to one instruction address) is held on the stack. It should be noted that what is required is to hold, on the stack, the same memory address as that designated by the fetch request.

The instruction "push error_flag" is to hold various status flags such as the status register and the operation result register on the stack.

The instruction "jump ERR_CORR" is the second instruction described above. This instruction "jump ERR_CORR" instructs the CPU 11 to jump to the error correction routine in which the error correction process for the instruction that has been read is executed using the error correction code. "ERR_CORR" indicates the start address of the memory area for storing the error correction routine.

By delivering these instructions (push PC, push error_flag, jump ERR_CORR) to the CPU 11, the CPU 11 operates in the same manner as if this series of code is described in the memory location designated by the address requested to be fetched. Specifically, with the arrival of the execution timing of these instructions, the CPU 11 first executes the process of holding, on the stack, the same memory address (e.g., PC-1) as the memory address for which an ECC error is detected, and then executes the process of holding the error flag on the stack. After that, the CPU 11 jumps to the error correction routine. The CPU 11, executing the error correction routine, corrects an error of the instruction that has read or the contents of the memory area storing this instruction, using the corresponding error correction code this instruction. When the error correction process for the instruction containing an error is completed, the CPU 11 exits from the error correction routine. Upon completion of the error correction process by the error correction routine, the memory address held on the stack is loaded to the program counter of the CPU 11. By this, the value of the program counter is returned to the value of the program counter as of the time point when the fetch request to fetch the instruction containing an error is issued. As a result, the control can be returned to the very instruction for which an error is detected, and therefore, the CPU 11 again fetches the instruction in which an error has occurred. By this time point, the error of the instruction has already been corrected.

As described above, according to this embodiment, the instruction to be sent to the CPU 11 is changed from the instruction for which an ECC error is detected to a series of the instructions (push PC, push error_flag, jump ERR_CORR). Therefore, the memory error, i.e., an error of the instruction that has been read from the memory 13, can be corrected without using a special method such as an interrupt.

In a case where one instruction is fetched in response to one fetch request, the instruction transmission module 131, after sending out the instruction "push PC" to the CPU 11 as data responsive to the fetch request, waits for the succeeding fetch request transmitted from the CPU 11. In response to the succeeding fetch request, the instruction transmission module 131 sends out the instruction "push error_flag" to the CPU 11 as data responding to the fetch request. After that, the instruction transmission module 131 waits again for the next succeeding fetch request transmitted from the CPU 11. In response to the reception of the succeeding fetch request, the instruction transmission module 131 sends out the instruction "jump ERR_CORR" to the CPU 11 as data responding to the fetch request thus received.

Incidentally, the instruction "push error_flag" is not always required, thus sending out thereof to the CPU 11 may be omitted.

In a case where existence of an error in the instruction that has been read fails to be detected, the instruction transmission module 131 sends out the instruction that has been read, to the CPU 11 as data responding to the fetch request. In this case, the instruction that has been read can be fetched from, for example, the cache memory 123.

As described above, the instruction "push PC" is to hold, on the stack, the same memory address as the memory address (the memory address for storing the instruction with an EEC error) designated by the fetch request, and therefore, hereinafter simply expressed as "push PC".

The instruction transmission module 131 includes the code storage unit 124 and the selector 125. The code storage unit 124 has stored therein the series of the instructions (push PC, push error_flag, jump ERR_CORR). The selector 125 selects one of the code storage unit 124 and the cache memory 123 in accordance with whether an error is detected in the instruction requested by the CPU 11 to be fetched, and from the selected one, fetches the instruction to be sent out to the CPU 11.

Next, the code switching operation for error correction according to this embodiment will be described with reference to FIG. 2.

Figure 2:
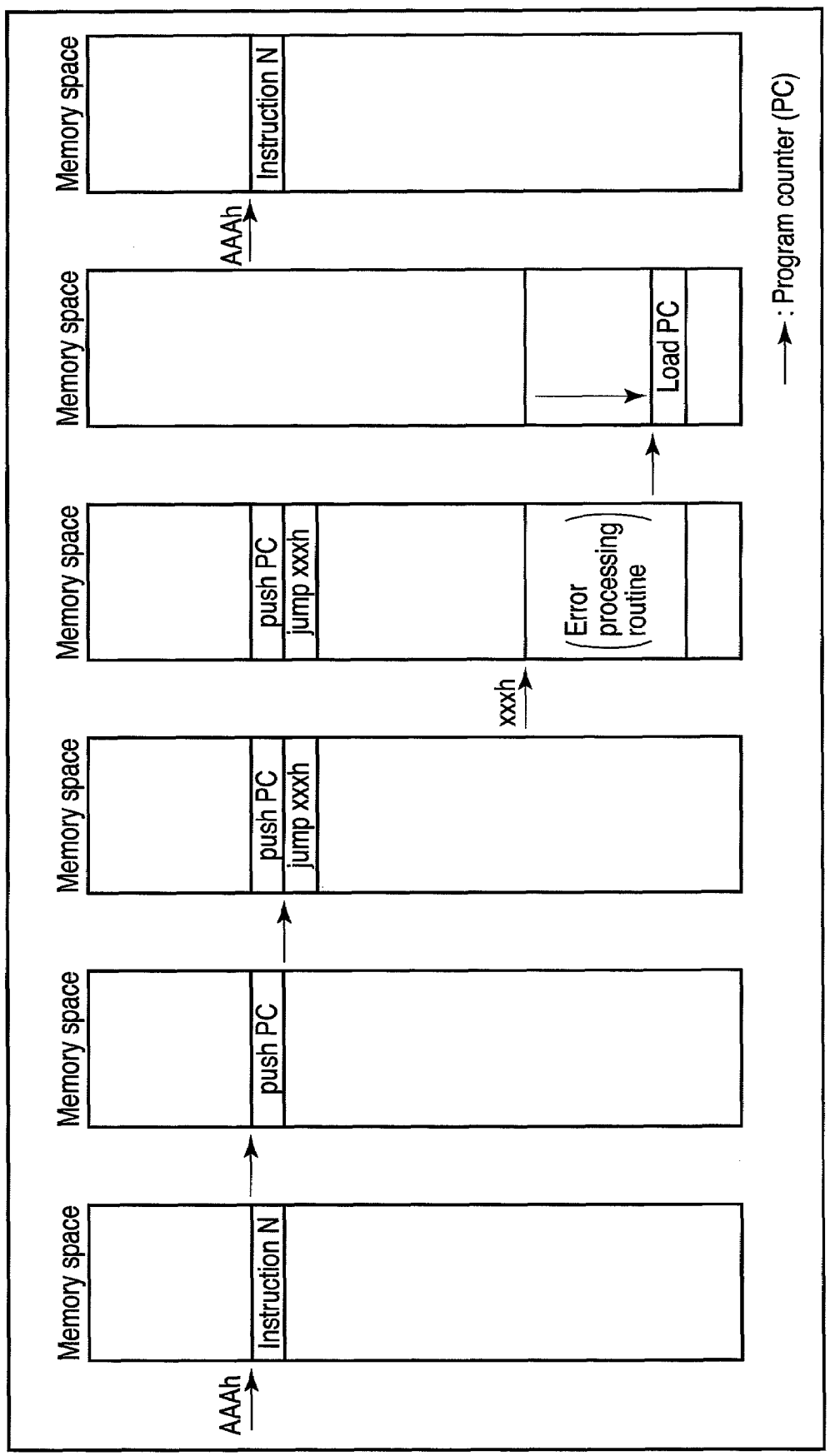
FIG. 2 is an exemplary diagram for explaining a code switching operation for error correction executed by the information processing apparatus according to the embodiment.

FIG. 2 shows the chronological relation between the change in the value of the program counter (PC register) and the instruction fetched by the CPU 11. In FIG. 2, the arrows indicate the value on the program counter (PC register), i.e., the memory address of the instruction to be fetched. Also, FIG. 2 shows a case in which the instruction "push error_flag" is not sent out to the CPU 11.

Here, an assumption is made of a case where the instruction N to be fetched at the address AAAh is detected to be in error when read from the memory 13. In this case, the instruction "push PC" is sent out to the CPU 11 in place of the instruction N. Once the value of the program counter (PC register) is updated, the request to fetch the next instruction is issued from the CPU 11. In the process, the instruction "jump xxxh" is sent out to the CPU 11. The characters "xxxh" indicates the start address of the memory area storing the error correction routine.

The CPU 11 sequentially fetches and executes the instruction "push PC" and the instruction "jump xxxh" in the same manner as if the instruction "push PC" exists at the address AAAh and the instruction "jump xxxh" at the address AAA+1h.

Upon execution of the instruction "push PC" by the CPU 11, the address "AAAh" is held on the stack. Then, the CPU 11, upon execution of the instruction "jump xxxh", jumps to the error correction routine.

As the result of execution of the instruction "jump xxxh", the value on the program counter (PC register) is changed to "xxxh". The CPU 11 executes, while fetching, the instructions of the error correction routine (the instructions for the error correction process). An instruction (Load PC) to load the memory address held on the stack to the program counter is described at the trailing end of the error correction routine. At the time of returning from the error correction routine, i.e., upon completion of the error correction process, therefore, the value of the program counter is returned to "AAAh". As a result, the CPU 11 issues a fetch request to read the instruction N at the address AAAh from the memory 13.

Next, the operation of the control circuit 12 will be described with reference to the flowchart of FIG. 3.

The control circuit 12 receives the fetch request (code fetch request) transmitted from the CPU 11 (step S101). In response to the reception of this fetch request, the control circuit 12 executes the process of reading, from the memory 13, the instruction (code) designated by the memory address contained in the fetch request and the ECC error detection process for determining whether an error exists or not in the instruction that has been read (step S102).

In a case where existence of an error in the instruction that has been read is not detected (NO in step S103), the control circuit 12 sends out the instruction that has been read (the instruction designated by the memory address contained in the fetch request) to the CPU 11 (step S104).

In a case where existence of an error in the instruction that has been read is detected (YES in step S103), on the other hand, the control circuit 12 fetches the instruction "push PC" from the code storage unit 124 and sends out the instruction "push PC" to the CPU 11 in place of the instruction that has been read (step S105). Then, the control circuit 12 waits until the reception of the next fetch request from the CPU 11. Upon reception of the next fetch request (YES in step S106), the control circuit 12 fetches the instruction "jump ERR_CORR" from the code storage unit 124, and sends out the instruction "jump ERR_CORR" to the CPU 11 (step S107).

Next, a description will be made of the error correction process executed by the CPU 11 executing the error correction routine with reference to the flowchart of FIG. 4.

The CPU 11 can specify an error address by acquiring, for example, from the error detection module 122, the memory address of the instruction for which an error is detected. Then, the CPU 11 determines whether the error that has occurred (the error of the instruction in which the error is detected) can be corrected using the error correction code or not (step S201). In a case where an error that has occurred can be corrected (YES in step S201), the CPU 11 executes the error correction process (ECC error correction process) using the error correction code corresponding to the instruction for which the error is detected (step S202).

In a case where an error that has occurred cannot be corrected (NO in step S201), on the other hand, the CPU 11 executes the process (reload process) of reloading the instruction for which the error has been detected from the nonvolatile memory 14 to the memory 13 (step S203).

After that, in order to leave the error correction routine, the CPU 11 loads the memory address held on the stack to the program counter (PC register) (step S204). As a result, the control is returned to the instruction for which the error is detected.

As described above, according to this embodiment, upon detection of an error in the instruction which is requested to be fetched, the instruction "push PC" and the instruction "jump ERR_CORR" are sent out to the CPU 11 in place of the instruction that has been read. Therefore, without sending out the interrupt signal to the CPU 11, the memory error can be corrected and the control can be returned to the instruction for which an error is detected.

Also, the control is passed to the error correction routine not at the timing when the occurrence of an error is detected but when the instruction "jump ERR_CORR" is actually executed by the CPU 11. Even in a case where an instruction to wait for execution has already existed in the pipeline or the instruction queue of the core unit 111, therefore, the execution of the error correction routine can be started without affecting the execution of the instructions.

Incidentally, this invention is not limited to the aforementioned embodiments as they are but can be embodied by modification of the structural elements thereof without departing from the spirit and scope of the invention. For example, the one-bit correction is made in the error detection module 122, and only in a case where the correction of more than 1 bit is required, the selector 125 may be switched and the instruction of the code storage unit 124 sent out to the CPU 11.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
    a processor;
    a memory interface module configured to read one of instructions stored in a memory in accordance with a memory address designated by a fetch request from the processor;
    an error detection module configured to detect whether an error exists in the read instruction using an error correction code on the memory, which corresponds to the read instruction: and
    an instruction transmission module configured to send to the processor a first instruction to store the same memory address as the memory address designated by the fetch request into a stack and a second instruction to jump to an error correction routine for correcting an error of the read instruction instead of sending the read instruction to the processor upon detection of the error in the read instruction, wherein the memory address stored in the stack is loaded on a program counter of the processor after completion of an error correction by the error correction routine.

2. The information processing apparatus of claim 1, wherein the instruction transmission module is configured to send the read instruction to the processor when there is no error detected in the read instruction.

3. The information processing apparatus of claim 2, wherein the instruction transmission module is configured to send the first instruction as data to the processor in response to the fetch request, to wait for a subsequent fetch request from the processor, and to send the second instruction as response data to the processor in response to the subsequent fetch request.

4. The information processing apparatus of claim 1, wherein the instruction transmission module comprises a code storage module configured to store the first instruction and the second instruction, the instruction transmission module being configured to fetch the first instruction and the second instruction from the code storage module upon the detection of the error in the read instruction.

5. The information processing apparatus of Cairn 1, wherein the error correction routine comprises instructions for correcting the error of the read instruction and an instruction to load the memory address stored in the stack to the program counter of the processor.

6. The information processing apparatus of claim 1, wherein the processor comprises a core unit of the pipeline structure comprising a plurality of stages, and the processor is configured to prefetch instructions.

7. An information processing system comprising:
    a processor;
    a memory configured to store instructions and error correction codes corresponding to the instructions;
    a memory interface module configured to read one of the instructions stored in the memory in accordance with a memory address designated by a fetch request from the processor;
    an error detection module configured to detect whether an error exists in the read instruction using the error correction code on the memory, which corresponds to the read instruction; and
    an instruction transmission module configured to send to the processor a first instruction to store the same memory address as the memory address designated by the fetch request into a stack and a second instruction to jump to an error correction routine for correcting an error of the read instruction to the processor instead of sending the read instruction upon detection of the error in the read instruction, wherein the memory address stored in the stack is loaded on a program counter of the processor after completion of an error correction by the error correction routine.

8. The information processing system of claim 7, wherein the instruction transmission module is configured to send the read instruction to the processor when there is no error detected in the read instruction.

9. The information processing system of claim 7, wherein the instruction transmission module is configured to send the first instruction as data to the processor in response to the fetch request, to wait for a subsequent fetch request from the processor, and to send the second instruction as response data to the processor in response to the subsequent fetch request, when the error of the read instruction is detected.

10. An error correction method for correcting a memory error, comprising:

reading one of instructions stored in a memory in accordance with a memory address designated by a fetch request from a processor;

detecting whether an error exists in the read instruction using an error correction code on the memory, which corresponds to the read instruction;

sending to the processor a first instruction to store the memory address designated by the fetch request into a stack and a second instruction to jump to an error correction module for correcting an error of the read instruction instead of sending the read instruction to the processor upon detection of the error in the read instruction; and loading the memory address stored in the stack on a program counter of the processor after completion of an error correction by the error correction routine.

11. The error correction method of claim 10, further comprising sending the read instruction to the processor when there is no error detected in the read instruction.

* * * * *